(12) United States Patent
Waltho et al.

(10) Patent No.: US 7,907,904 B2
(45) Date of Patent: *Mar. 15, 2011

(54) MITIGATING INTERFERENCE TO NEARBY RADIO SYSTEMS BASED ON CHARACTERIZATION OF ADJACENT CHANNELS

(75) Inventors: Alan E. Waltho, San Jose, CA (US); Jeffrey Schiffer, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1318 days.

This patent is subject to a terminal disclaimer.

(21) Appl. No.: 11/042,703

(22) Filed: Jan. 24, 2005

(65) Prior Publication Data

US 2006/0166692 A1    Jul. 27, 2006

(51) Int. Cl.
H04B 15/00 (2006.01)
H04B 17/00 (2006.01)
H04B 1/00 (2006.01)
H04B 7/185 (2006.01)
H03F 1/36 (2006.01)

(52) U.S. Cl. ............... 455/63.1; 455/67.13; 455/67.11; 455/62; 370/318; 330/75

(58) Field of Classification Search .......... 455/522, 455/67.11, 69, 62, 67.13, 63.1, 452.1, 423, 455/450, 451; 370/318; 330/75
See application file for complete search history.

(56) References Cited

U.S. PATENT DOCUMENTS

| | | | |
|---|---|---|---|
| 4,868,885 A * | 9/1989 | Perry ............................ 455/10 |
| 5,546,132 A * | 8/1996 | Kim et al. ..................... 348/607 |
| 6,230,022 B1 | 5/2001 | Sakoda et al. |
| 6,272,125 B1 * | 8/2001 | Nomura ........................ 370/342 |
| 6,374,116 B1 * | 4/2002 | Peterzell et al. .............. 455/522 |
| 6,539,235 B1 * | 3/2003 | Schwent et al. .............. 455/522 |
| 6,710,651 B2 * | 3/2004 | Forrester ....................... 330/129 |
| 6,735,423 B1 * | 5/2004 | Uskali et al. ............... 455/249.1 |
| 7,203,511 B2 * | 4/2007 | Trachewsky et al. ........ 455/522 |
| 7,239,624 B2 * | 7/2007 | Buchwald et al. ............ 370/338 |
| 7,308,279 B1 * | 12/2007 | Zweig .......................... 455/522 |
| 2002/0021687 A1 | 2/2002 | Toki et al. |
| 2002/0086641 A1 * | 7/2002 | Howard ....................... 455/67.1 |
| 2002/0191710 A1 * | 12/2002 | Jeckeln et al. ................ 375/296 |
| 2004/0070386 A1 * | 4/2004 | Muto et al. ................. 324/76.29 |
| 2004/0198232 A1 * | 10/2004 | Fu ............................. 455/67.11 |

(Continued)

FOREIGN PATENT DOCUMENTS

WO    00/77950 A1    12/2000

(Continued)

OTHER PUBLICATIONS

Stapleton, Shawn P. and Costescu, Flaviu C., "An Adaptive Predistorter for a Power Amplifier Based on Adjacent Channel Emissions," Feb. 1992, IEEE Transactions on Vehicular Technology, vol. 41, pp. 49-56.*

(Continued)

Primary Examiner — Nay Maung
Assistant Examiner — Andrew Wendell
(74) Attorney, Agent, or Firm — Scott M. Lane

(57) ABSTRACT

A wireless device dynamically controls a power level for each channel in a transmission spectrum. The power level is adjusted based on characteristics of signals received in the adjacent channels which results in the wireless device working at maximum ranges consistent with not causing interference to other users of the spectrum.

8 Claims, 3 Drawing Sheets

U.S. PATENT DOCUMENTS

| | | | |
|---|---|---|---|
| 2004/0203392 A1* | 10/2004 | Hsu et al. | 455/62 |
| 2004/0264408 A1* | 12/2004 | Aaltonen et al. | 370/329 |
| 2005/0215203 A1* | 9/2005 | Waltho et al. | 455/69 |
| 2006/0067354 A1* | 3/2006 | Waltho et al. | 370/433 |
| 2006/0160550 A1* | 7/2006 | Edwards | 455/509 |

FOREIGN PATENT DOCUMENTS

| | | |
|---|---|---|
| WO | 2006/079113 A1 | 7/2006 |

OTHER PUBLICATIONS

International Search Report/ Written Opinion PCT Patent Application Number PCT/US2006/002653, mailed on Jun. 7, 2006, 9 pages.

International Prliminary Report on Patentability for PCT Patent Application No. PCT/US2006/002653, mailed on Aug. 2, 2007, 6 pages.

* cited by examiner

MITIGATING INTERFERENCE TO NEARBY RADIO SYSTEMS BASED ON CHARACTERIZATION OF ADJACENT CHANNELS

Devices that communicate using Radio Frequency (RF) signals emit RF signal energy that may interfere and affect the quality of service of nearby receivers operating on adjacent channels.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
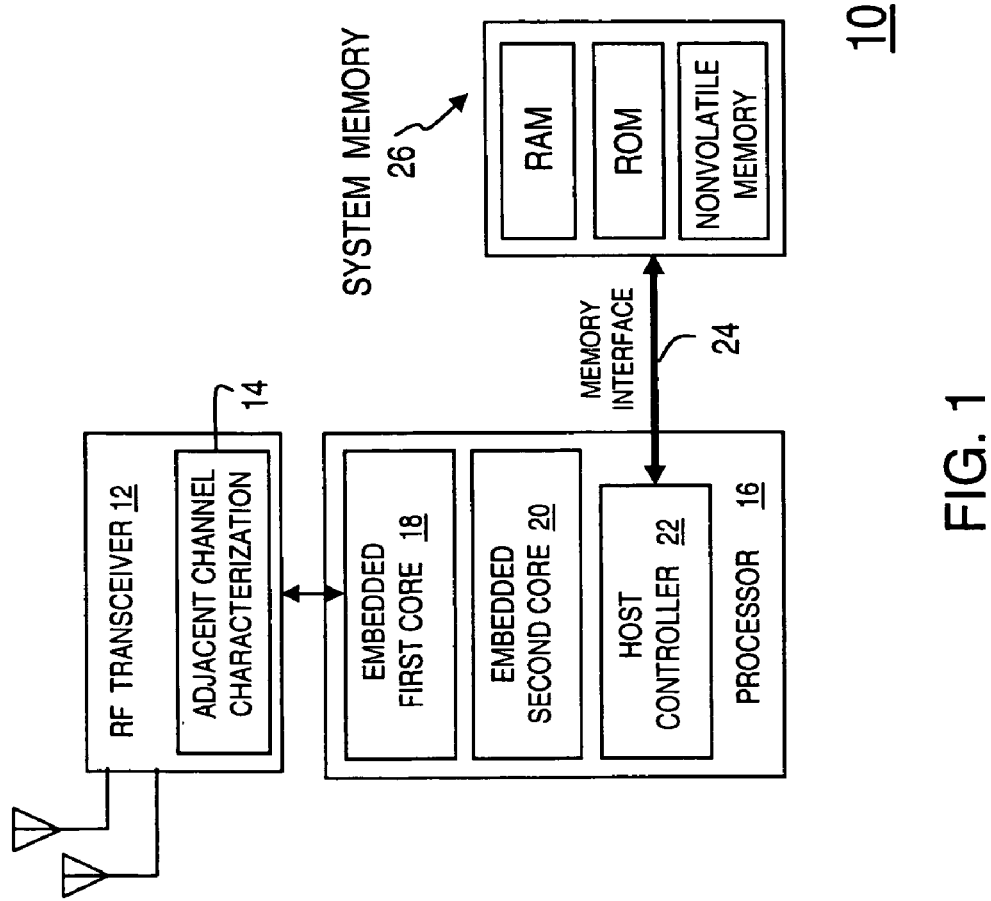
FIG. 1 is a diagram that illustrates a wireless device that incorporates circuitry and algorithms to monitor and analyze adjacent radio channels in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

FIG. 1 illustrates features of the present invention that may be incorporated, for example, into a wireless communications device 10. In the wireless communications embodiment, a transceiver 12 both receives and transmits a modulated signal from one or more antennas. The analog front end transceiver may be a stand-alone Radio Frequency (RF) integrated analog circuit, or alternatively, be embedded with a processor 16 as a mixed-mode integrated circuit. The received modulated signal may be frequency down-converted, filtered, then converted to a baseband, digital signal. An adjacent channel characterization block 14 determines and stores channel parameters and will be described below.

Processor 16 may include baseband and applications processing functions and utilize one or more processor cores and/or firmware and hardware in an Application Specific Integrated Circuit (ASIC) device. Blocks 18 and 20, in general, process functions that fetch instructions, generate decodes, find operands, and perform appropriate actions, then store results. The use of multiple cores may allow one core to be dedicated to handle application specific functions such as, for example, graphics, modem functions, etc. Alternatively, the multiple cores may allow processing workloads to be shared across the cores. A host controller 22 includes a hardware/software interface between a host controller software driver and the host controller hardware that exchanges data across memory interface 24 with a system memory 26. System memory 26 may include a combination of memories such as a Random Access Memory (RAM), a Read Only Memory (ROM) and a nonvolatile memory, although the type or variety of memories included in system memory 26 is not a limitation of the present invention.

Wireless communications device 10 may have applications in laptops, mobile phones, MP3 players, headsets, cameras, communicators and Personal Digital Assistants (PDAs), medical or biotech equipment, automotive safety and protective equipment, and automotive infotainment products. However, it should be understood that the scope of the present invention is not limited to these examples.

As shown, communications device 10 includes a radio, allowing communication in an RF/location space with other devices and may include network connections to send and receive files or other information such as voice or video. Accordingly, communications device 10 may operate in a wireless network such as, for example, a cellular network, a Personal Area Network (PAN), a Wireless Personal Area Network (WPAN), an Ultra-Wideband (UWB) network, a Piconet or a combination thereof. Note that the type of network is not intended to limit the claimed invention. It should further be noted that communications device 10 may function and communicate apart from any network. Therefore, in general, communications device 10 is any type of wireless device capable of communicating in an RF/location space with another device where interference may affect the quality of service of nearby receivers operating on adjacent channels.

Prior art radio systems adaptively set their transmit power to achieve a maximum link throughput on an error free basis. Transmission at full power by these prior art radio systems may result in interference to these receivers by breakthrough on the adjacent channels. In contrast and in accordance with the present invention, a given channel selected for communication has a transmit power adaptively controlled to reduce interference on adjacent channels. Accordingly, a characterization block 14 cognitively monitors the signal power in the adjacent channels in order to set the transmit power for that given channel. The election of the transmit power for any channel is based on the monitored power in the two adjacent channels. In the event that one of the adjacent channels is determined to be vacant, then only the signal power in the occupied adjacent channel is considered. In the event that both adjacent channels are determined to be vacant, then full power may be transmitted for that transmit channel.

Thus, communications device 10 improves service quality on the adjacent channels by characterizing the adjacent channels to identify the adjacent channel having the lower power. Again, that identified lower power is used to set a transmit power for the transmit channel that protects the adjacent channels. This results in communications device 10 providing the desired transmission qualities without affecting the quality of service on the adjacent channels.

Note that an unlicensed device may also cause adjacent channel interference when it's out of band spurious emissions are not adequately suppressed. Since adjacent channel characterization block 14 in transceiver 12 monitors the signal power in both adjacent channels and selects the lower power in the two adjacent channels, the interference from the unlicensed device is mitigated. Again, transceiver 12 transmits with a transmitter power controlled relative to the desired signals of the adjacent channel receivers, so out of band emissions may be reduced in the same proportion as the wanted emissions. By reducing the out of band emissions in the adjacent channel the interference to a receiver operating on the adjacent channel is reduced. Characterization block 14 allows licensed and unlicensed users to share spectrum without generating unwanted interference. Characterization block 14 may also be used to protect a higher priority user.

Figure 2:
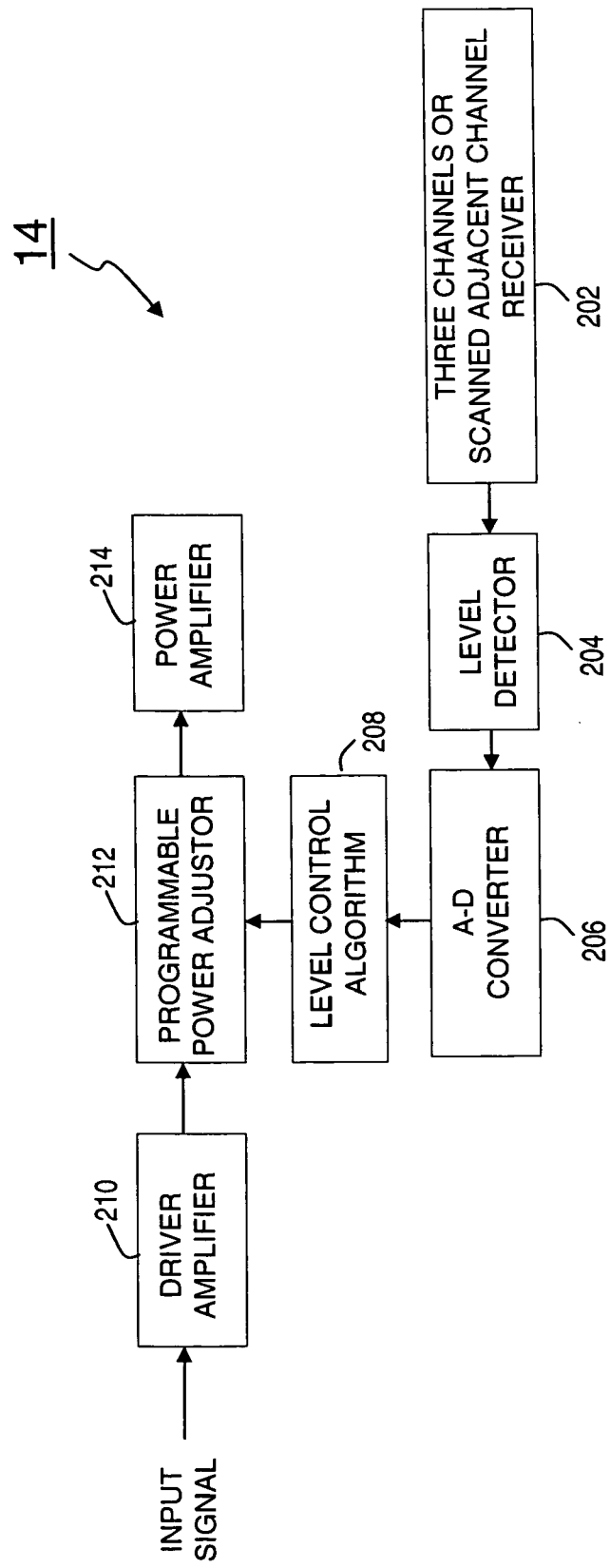
FIG. 2 is a block diagram that illustrates the monitoring of the adjacent radio channel and the selection of a transmit power used by the wireless device of FIG. 1.

FIG. 2 is a block diagram for adjacent channel characterization block 14 showing three channels or scanned adjacent channel receiver 202; a level detector 204; an A-D converter 206; a level control algorithm 208; a driver amplifier 210; a programmable power adjustor 212; and a power amplifier 214. In accordance with the present invention, adjacent channel characterization block 14 performs the task of monitoring the adjacent radio channels, identifying the channel having the lower power, and selecting a transmit power for the transmit channel.

Adjacent channel receiver 202 is a radio receiver. In one embodiment, adjacent channel receiver 202 may be implemented to monitor three channels in which are received simultaneously. In another embodiment, adjacent channel receiver 202 may be implemented as a scanning receiver where the two adjacent channels are received sequentially. For either embodiment, adjacent channel receiver 202 is tunable to the two channels adjacent to the channel on which it is intended to transmit.

Level detector 204 is a circuit block that extracts the average amplitude coefficient of a sinusoidal signal. Level detector 204 is coupled to adjacent channel receiver 202 and receives the signal power in the two channels adjacent to the channel on which it is intended to transmit.

A-D converter 206 converts a time varying analog signal to its equivalent digitally sampled representation. Level detector 204 supplies two analog signals, i.e., the two average amplitude coefficients for the two adjacent channels determined by level detector 204. A-D converter 206 converts the two average amplitude coefficients to digital output signals. It is not intended that the choice of analog storage or the type of A-D converter 206 limit the present invention. In other words, the embodiment of the present invention is not limited by the specific method of conversion employed, the resolution of the A-D converter as related to the number of bits or the voltage range or linearity of the A-D converter.

Level control algorithm 208 is connected to A-D converter 206 to receive the two digital signals. Level control algorithm 208 calculates a transmitter power for the transmit channel based on the two signal levels and the signal types detected in the two adjacent channels. The characterization of the adjacent channels may include a type of modulation for the three major television standards, i.e., National Television System Committee (NTSC), Phase Alternating Line (PAL) or Sequential Couleur Avec Memoire (SECAM), as well as digital television (DTV), etc. The allowable transmitter power is compared with the transmitter power currently set in power amplifier 214, and a correction signal is developed to feed to programmable power adjustor 212. The correction signal is based on a difference value between the calculated transmitter power and the transmitter power currently set in power amplifier 214.

Driver amplifier 210 is an intermediate level linear power amplifier used to isolate the frequency up-converter from any mismatches caused by filters (not shown) or by power amplifier 214. Programmable power adjustor 212 may be a switched resistive network that is programmed to adjust the signal received from driver amplifier 210 by any one of a number of preset values. Power amplifier 214 receives the signal from programmable power adjustor 212 and provides the signal that is transmitted from the antenna.

Figure 3:
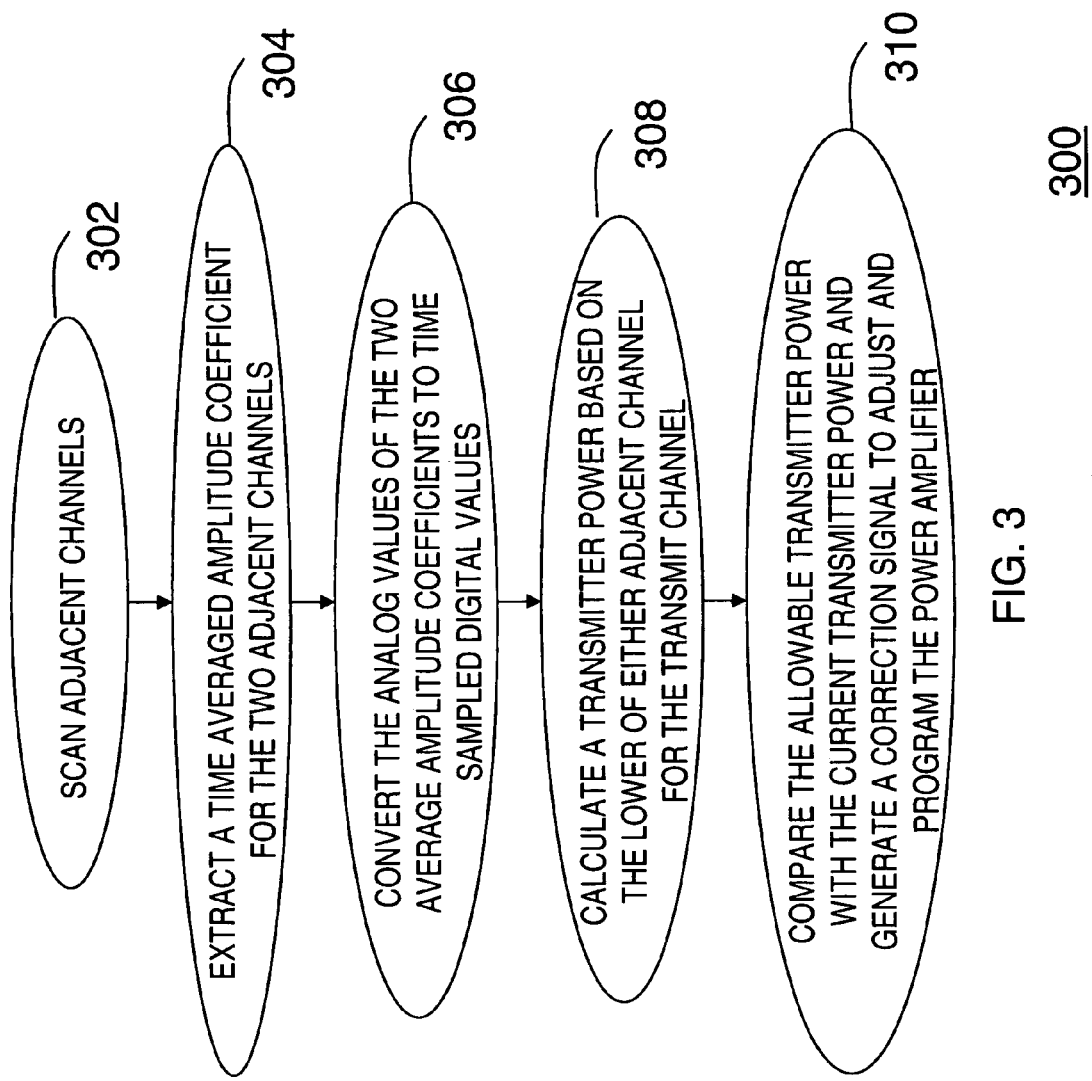
FIG. 3 is a diagram that illustrates a method of characterizing the adjacent radio channels by a wireless device in accordance with the present invention.

FIG. 3 shows a flowchart in accordance with various embodiments of the present invention. In some embodiments, method 300, or portions thereof, is performed in normal operation by the RF transceiver. Note that method 300 is not limited by the particular type of apparatus, software element, or system performing the method. Method 300 is shown beginning at block 302 in which RF transceiver 12 scans the channels adjacent to the transmit channel. In block 304 the time averaged amplitude coefficients for the two adjacent channels are extracted. In block 306 the analog values for the time averaged amplitude coefficients for the two adjacent channels are converted to sampled digital values. A lower value of the two converted values is selected and a transmit power for the transmit channel is calculated in block 308. In block 310 the allowable transmitter power is compared with the current transmitter power, and a correction signal is generated to adjust and program the power amplifier. Note that the various actions in method 300 may be performed in the order presented, or may be performed in a different order. Further, in some embodiments, additional actions may be included in method 300.

By now it should be apparent that the present invention enhances transmission quality and provides protection to adjacent channel receivers. The adaptive power control selected for each channel is based on monitoring the characteristics of the adjacent channels. By setting the proper transmission power for each transmit channel, the present invention allows wireless devices to work at the maximum range consistent with limiting interference to other users of the spectrum.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An unlicensed wireless device configured to share spectrum between licensed and unlicensed wireless devices without generating unwanted interference by the unlicensed wireless device, comprising:
   an antenna to receive signals on a given channel and channels adjacent to the given channel;
   a channel receiver configured to investigate, in the unlicensed wireless device, the received signals to determine a received signal power level and a received signal type of the received signals in channels adjacent to the given channel;
   a level detector configured to extract time averaged amplitude coefficients for the channels adjacent to the given channel;
   an analog to digital converter to convert analog values of the time averaged amplitude coefficients to time sampled digital values;

a level control algorithm configured to determine a lower power in one of the channels adjacent to the given channel and to generate a correction signal to adjust the signal supplied to a power amplifier; and a programmable power adjustor to adjust the power amplifier configured to transmit signals on the given channel without generating the unwanted interference to the licensed wireless device on at least one of the channels adjacent to the given channel, the transmitted signal on the given channel set in response to the received signal power level and the received signal type.

2. The unlicensed wireless device of claim 1, wherein the received signals are selected from group consisting of NTSC, PAL, SECAM, and DTV.

3. The unlicensed wireless device of claim 2, wherein the power amplifier is adjusted based on received signals in an occupied adjacent channel in the event that one adjacent channel is vacant.

4. The unlicensed wireless device of claim 1, wherein the power amplifier is set at full power in the event that both adjacent channels are vacant.

5. A method of sharing spectrum between licensed and unlicensed wireless devices without generating unwanted interference by the unlicensed wireless device, comprising:

investigating, in the unlicensed wireless device, received signals to determine a received signal power level and a received signal type of the received signals in channels adjacent to a given channel;

extracting time averaged amplitude coefficients for the channels adjacent to the given channel;

converting analog values of the time averaged amplitude coefficients to time sampled digital values;

determining a lower power in one of the channels adjacent to the given channel;

generating a correction signal to adjust the signal supplied to a power amplifier, and adjusting the power amplifier to provide a signal to transmit on the given channel without generating the unwanted interference to the licensed wireless device on at least one of the channels adjacent to the given channel, the signal on the given channel set in response to the received signal power level and the received signal type.

6. The method of claim 5 wherein the received signal type is selected from the group consisting of NTSC, PAL, SECAM, and DTV.

7. The method of claim 6 setting the power amplifier based on received signals in an occupied adjacent channel in the event that one adjacent channel is vacant.

8. The method of claim 5 setting the power amplifier at full power in the event that both adjacent channels are vacant.

* * * * *